US008606585B2

(12) United States Patent
Melamed et al.

(10) Patent No.: US 8,606,585 B2
(45) Date of Patent: Dec. 10, 2013

(54) AUTOMATIC DETECTION OF AUDIO ADVERTISEMENTS

(75) Inventors: Ilya Dan Melamed, New York, NY (US); Yeon-Jun Kim, Whippany, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 604 days.

(21) Appl. No.: 12/884,436

(22) Filed: Sep. 17, 2010

(65) Prior Publication Data

US 2011/0145002 A1      Jun. 16, 2011

Related U.S. Application Data

(63) Continuation-in-part of application No. 12/634,981, filed on Dec. 10, 2009.

(60) Provisional application No. 61/332,359, filed on May 7, 2010.

(51) Int. Cl.
*G10L 11/00* (2006.01)
*G06F 17/00* (2006.01)

(52) U.S. Cl.
USPC .......................................... 704/278; 700/94

(58) Field of Classification Search
USPC .......................................... 704/278; 700/94
See application file for complete search history.

(56) References Cited

U.S. PATENT DOCUMENTS

| | | | |
|---|---|---|---|
| 6,801,895 B1 * | 10/2004 | Huang et al. | 704/270 |
| 6,885,986 B1 | 4/2005 | Gigi | |
| 7,260,439 B2 | 8/2007 | Foote et al. | |
| 2003/0023972 A1 * | 1/2003 | Gutta et al. | 725/34 |
| 2004/0001161 A1 * | 1/2004 | Herley | 348/465 |
| 2009/0133092 A1 | 5/2009 | Casagrande | |
| 2010/0111312 A1 * | 5/2010 | Duxans Barrobes et al. | 381/56 |

OTHER PUBLICATIONS

U.S. Appl. No. 12/634,981 to Yeon-Jun Kim et al., filed Dec. 10, 2009.

* cited by examiner

*Primary Examiner* — Samuel G Neway
(74) *Attorney, Agent, or Firm* — Greenblum & Bernstein, P.L.C.

(57) ABSTRACT

A method, apparatus, and computer-readable medium for editing a data stream based on a corpus are provided. The data stream includes stream words. A sequence includes a predetermined number of sequential words of the stream words. The method, apparatus, and computer-readable medium determine whether the sequence exists in the corpus at least at a predetermined minimum frequency. When the sequence exists in the corpus at least at the predetermined minimum frequency, the sequence is edited in the data stream.

20 Claims, 8 Drawing Sheets

FIG. 8

| Method | Precision | Recall | $F_1$ |
|---|---|---|---|
| 2-State Ergodic HMM | .38 | .90 | .54 |
| 3-State Ergodic HMM | .42 | .89 | .57 |
| Pitch Dynamics | .75 | .93 | .83 |
| N-Gram | .85 | .93 | .89 |
| Combined | .92 | .93 | .92 |

US 8,606,585 B2

AUTOMATIC DETECTION OF AUDIO ADVERTISEMENTS

CROSS-REFERENCE TO RELATED APPLICATIONS

This application is a Continuation-in-Part of U.S. patent application Ser. No. 12/634,981, filed on Dec. 10, 2009, the disclosure of which is expressly incorporated herein by reference in its entirety. This application claims the benefit of U.S. Provisional Patent Application No. 61/332,359, filed on May 7, 2010, the disclosure of which is expressly incorporated herein by reference in its entirety.

BACKGROUND

1. Field of the Disclosure

The present disclosure relates to editing a data stream. More particularly, the present disclosure relates to a method for detecting and editing advertisements in a transcript of a conversation recording.

2. Background Information

Customer service call centers of many companies record their service calls for quality control purposes. When service calls are recorded, they are stored on a media server for future playback. The service calls are generally transcribed by automatic speech recognition software. The transcripts are indexed in the media server for searching. A quality analyst performs searches on the indexed transcripts to retrieve a list of service calls that satisfy various criteria, such as service calls that include specific words or phrases. The analyst can then retrieve those service calls from the media server and analyze them for quality control purposes.

BRIEF DESCRIPTION OF THE DRAWINGS

FIG. 8 is a table of the results of editing data streams according to various baseline methods and according to exemplary embodiments of the present application.

DETAILED DESCRIPTION

Figure 1:
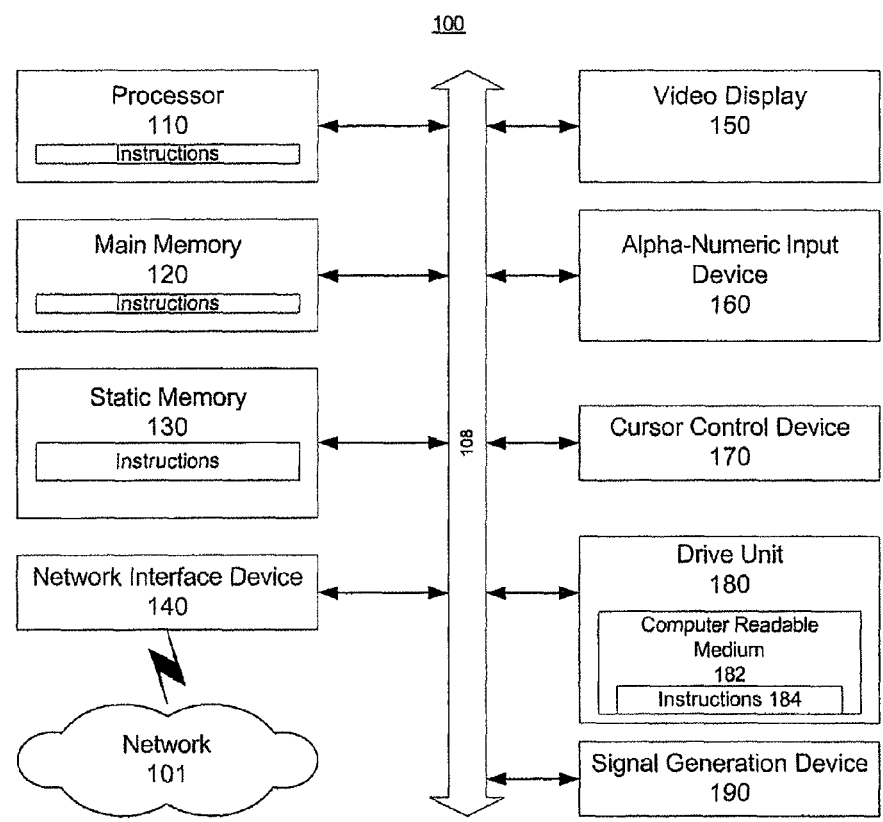
FIG. 1 is an exemplary general computer system that includes a set of instructions for editing a data stream.

In view of the foregoing, the present disclosure, through one or more of its various aspects, embodiments and/or specific features or sub-components, is thus intended to bring out one or more of the advantages as specifically noted below.

According to a non-limiting embodiment of the present disclosure, a method for editing a data stream is provided. The data stream includes stream words and is edited based on a corpus. The method includes determining whether a sequence of the stream words exists in the corpus at least at a predetermined minimum frequency. The sequence includes a predetermined number of sequential words of the stream words. When the sequence exists in the corpus at least at the predetermined minimum frequency, the sequence is edited in the data stream.

According to one aspect of the present disclosure, the method further includes determining whether a segment of the data stream satisfies a predetermined acoustic condition. The segment has a predetermined duration, and the segment is edited in the data stream when the segment satisfies the predetermined condition.

According to another aspect of the present disclosure, the method further includes determining whether at least a portion of the sequence exists in the segment. In this regard, the sequence is edited in the data stream only when at least the portion of the sequence exists in the segment, the sequence exists in the corpus at least at the predetermined minimum frequency, and the segment satisfies the predetermined condition.

According to yet another aspect of the present disclosure, the method further includes identifying, within the data stream, each of the sequential words of the sequence via automatic speech recognition. A timestamp is associated with each of the sequential words when each of the sequential words is identified. Furthermore, a position of the segment in the data stream is associated with the segment. In this regard, it is determined whether at least the portion of the sequence exists in the segment based on the timestamp of each of the sequential words of the sequence, the predetermined duration of the segment, and the position of the segment in the data stream.

According to still another aspect of the present disclosure, the method further includes identifying each of the stream words of the data stream via automatic speech recognition, and separating the stream words of the data stream into a plurality of sequences. Each of the plurality of sequences includes the predetermined number of sequential words of the stream words, and the sequence is one of the plurality of sequences.

According to an additional aspect of the present disclosure, the method further includes determining whether each of the plurality of sequences exists in the corpus at least at the predetermined minimum frequency, and editing each of the plurality of sequences in the data stream when the corresponding one of the plurality of sequences exists in the corpus at least at the predetermined minimum frequency.

According to another aspect of the present disclosure, when at least two of the plurality of sequences exist in the corpus at least at the predetermined minimum frequency, the method further includes determining whether the at least two of the plurality of sequences are separated in the data stream by less than a threshold number of words or a threshold length of time. When the at least two of the plurality of sequences are separated by less than the threshold number of words or the threshold length of time, the at least two of the plurality of sequences and separating words that separate the at least two of the plurality of sequences are combined to define a combined sequence. Thereafter, the combined sequence is edited in the data stream.

According to yet another aspect of the present disclosure, the method further includes determining whether each of a plurality of segments satisfies a predetermined acoustic condition, wherein each of the plurality of segments has a predetermined duration. It is further determined whether at least a portion of each of the plurality of sequences that exists in the corpus at least at the predetermined minimum frequency exists in one of the plurality of segments that satisfies the predetermined acoustic condition. In this regard, each of the plurality of sequences that exists in the corpus at least at the predetermined minimum frequency is edited only when at least the portion of the corresponding one of the plurality of sequences that exists in the corpus at least at the predetermined minimum frequency exists in one of the plurality of segments that satisfies the predetermined acoustic condition. In addition, it is also determined whether at least a portion of the combined sequence exists in one of the plurality of segments that satisfies the predetermined acoustic condition. In this regard, the combined sequence is edited only when at least the portion of the combined sequence exists in one of the plurality of segments that satisfies the predetermined acoustic condition.

According to still another aspect of the present disclosure, the data stream is a conversation transcript, and each of the plurality of sequences that exists in the corpus at least at the predetermined minimum frequency and the combined sequence identify advertisements in the conversation transcript.

According to an additional aspect of the present disclosure, the method further includes optimizing the predetermined number of sequential words, the predetermined minimum frequency, and at least one of the threshold number of words and the threshold length of time based on a database of conversation transcripts that include the advertisements.

According to another embodiment of the present disclosure, a non-transitory computer-readable recording medium encoded with an executable computer program for editing a data stream is provided. The data stream includes stream words and is edited based on a corpus. The non-transitory computer-readable recording medium includes a number of times determining code segment and an editing code segment. The number of times determining code segment determines whether a sequence of the stream words exists in the corpus at least at a predetermined minimum frequency. The sequence includes a predetermined number of sequential words of the stream words. The editing code segment edits the sequence in the data stream when the number of times determining code segment determines that the sequence exists in the corpus at least at the predetermined minimum frequency.

According to one aspect of the present disclosure, the recording medium further includes an acoustic condition determining code segment that determines whether a segment of the data stream satisfies a predetermined acoustic condition. The segment has a predetermined duration. The editing code segment edits the segment in the data stream when the acoustic condition determining code segment determines that the segment satisfies the predetermined condition.

According to another aspect of the present disclosure, the recording medium further includes an overlap determining code segment that determines whether at least a portion of the sequence exists in the segment. In this regard, the editing code segment edits the sequence only when the overlap determining code segment determines that at least the portion of the sequence exists in the segment, the number of times determining code segment determines that the sequence exists in the corpus at least at the predetermined minimum frequency, and the acoustic condition determining code segment determines that the segment satisfies the predetermined acoustic condition.

According to yet another aspect of the present disclosure, the recording medium further includes an automatic speech recognition code segment, a timestamp code segment, and a position code segment. The automatic speech recognition code segment identifies, within the data stream, each of the sequential words of the sequence via automatic speech recognition. The timestamp code segment associates a timestamp with each of the sequential words when each of the sequential words is identified by the automatic speech recognition code segment. The position code segment associates a position of the segment in the data stream with the segment. In this regard, the overlap determining code segment determines whether at least the portion of the sequence exists in the segment based on the timestamp of each of the sequential words of the sequence, the predetermined duration of the segment, and the position of the segment in the data stream.

According to still another aspect of the present disclosure, the number of times determining code segment determines whether each of a plurality of sequences exists in the corpus at least at the predetermined minimum frequency. Each of the plurality of sequences includes the predetermined number of sequential words of the stream words, and the sequence is one of the plurality of sequences. In this regard, the recording medium further includes a combining code segment that, when the number of times determining code segment determines that at least two of the plurality of sequences exist in the corpus at least at the predetermined minimum frequency, determines whether the at least two of the plurality of sequences are separated in the data stream by less than a threshold number of words or a threshold length of time. When the at least two of the plurality of sequences are separated by less than the threshold number of words or the threshold length of time, the combining code segment combines the at least two of the plurality of sequences and separating words that separate the at least two of the plurality of sequences to define a combined sequence. The editing code segment edits the combined sequence in the data stream.

According to an additional aspect of the present disclosure, the acoustic condition determining code segment determines whether each of a plurality of segments satisfies the predetermined acoustic condition. Each of the plurality of segments has a predetermined duration. The recording medium further includes an overlap determining code segment. The overlap determining code segment determines whether at least a portion of each of the plurality of sequences that exists in the corpus at least at the predetermined minimum frequency exists in one of the plurality of segments that satisfies the predetermined acoustic condition. The overlap determining code segment further determines whether at least a portion of the combined sequence exists in one of the plurality of segments that satisfies the predetermined acoustic condition. According to such an aspect, the editing code segment edits each of the plurality of sequences that exists in the corpus at least at the predetermined minimum frequency only when the overlap determining code segment determines that at least the portion of the corresponding one of the plurality of sequences that exists in the corpus at least at the predetermined minimum frequency exists in one of the plurality of segments that satisfies the predetermined acoustic condition. Furthermore, the editing code segment edits the combined sequence only when the overlap determining code segment determines that at least the portion of the combined sequence exists in one of the plurality of segments that satisfies the predetermined acoustic condition.

According to another embodiment of the present disclosure, an apparatus for editing a data stream is provided. The data stream includes stream words and is edited based on a corpus. The apparatus includes a number of times determiner and an editor. The number of times determiner determines whether a sequence of the stream words exists in the corpus at least at a predetermined minimum frequency. The sequence includes a predetermined number of sequential words of the stream words. The editor edits the sequence in the data stream when the number of times determiner determines that the sequence exists in the corpus at least at the predetermined minimum frequency.

According to one aspect of the present disclosure, the apparatus further includes an acoustic condition determiner that determines whether a segment of the data stream satisfies a predetermined acoustic condition. The segment has a predetermined duration, and the editor edits the segment in the data stream when the acoustic condition determiner determines that the segment satisfies the predetermined acoustic condition.

According to another aspect of the present disclosure, the apparatus further includes an overlap determiner that determines whether at least a portion of the sequence exists in the segment. In this regard, the editor edits the sequence only when the overlap determiner determines that at least the portion of the sequence exists in the segment, the number of times determiner determines that the sequence exists in the corpus at least at the predetermined minimum frequency, and the acoustic condition determiner determines that the segment satisfies the predetermined acoustic condition.

According to yet another aspect of the present disclosure, the number of times determiner determines whether each of a plurality of sequences exists in the corpus at least at the predetermined minimum frequency. Each of the plurality of sequences includes the predetermined number of sequential words of the stream words, and the sequence is one of the plurality of sequences. The apparatus further includes a sequence combiner that, when the number of times determiner determines that at least two of the plurality of sequences exist in the corpus at least at the predetermined minimum frequency, determines whether the at least two of the plurality of sequences are separated in the data stream by less than a threshold number of words or a threshold length of time. When the at least two of the plurality of sequences are separated by less than the threshold number of words or the threshold length of time, the sequence combiner combines the at least two of the plurality of sequences and separating words that separate the at least two of the plurality of sequences to define a combined sequence. The editor edits the combined segment in the data stream.

According to a non-limiting embodiment of the present application, data streams are able to be edited based on a corpus. Sequences of words of the data stream are identified, and it is determined whether each sequence of words exists in the corpus at least at a predetermined minimum frequency. Thereafter, the sequences that exist in the corpus at least at the predetermined minimum frequency are able to be edited in the data stream.

According to a non-limiting and advantageous effect of the present application, undesirable sequences of words are able to be edited in a data stream. For example, if the data stream is a specific conversation transcript that includes advertisements and the corpus includes a plurality of conversation transcripts that each include advertisements, a sequence of words of the specific conversation transcript can be compared against the corpus to determine whether the sequence of words is likely an advertisement. That is, if the sequence of words is repeated in a certain percentage of the plurality of conversation transcripts, it may be determined that the sequence of words is likely an advertisement. If the sequence of words is likely an advertisement, the sequence of words can be edited, such as, for example, by being deleted, in the data stream. Thereafter, if the conversation transcript is reviewed for quality control purposes, or for any other purpose, the reviewer will not have to review the portion of the conversation transcript that is likely an advertisement.

According to another non-limiting and advantageous effect of the present application, desirable sequences of words are able to be edited in a data stream. For example, if the data stream is a specific conversation transcript and the corpus includes a plurality of conversation transcripts, a sequence of words of the specific conversation transcript can be compared against the corpus to determine whether the sequence of words is a frequent complaint or topic of conversation in the conversation transcripts. If the sequence of words is a frequent complaint or topic of conversation, the sequence of words can be edited, such as, for example, by being highlighted or flagged, in the data stream. In this regard, reoccurring complaints and topics of conversations may be easily identifiable in the conversation transcript.

FIG. 1 is an illustrative embodiment of a general computer system that includes a set of instructions for editing a data stream based on a corpus as described herein. The general computer system is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices. For example, the computer system 100 may include or be included within any one or more of the computers, servers, systems, or communication networks described herein.

In a networked deployment, the computer system may operate in the capacity of a server or as a client user computer in a server-client user network environment, or as a peer computer system in a peer-to-peer (or distributed) network environment. The computer system 100, or portions thereof, can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or subsystems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an alpha-numeric input device 160, such as a keyboard, another input device (not shown), such as a remote control device having a wireless keypad, a keyboard, a microphone coupled to a speech recognition engine, a camera such as a video camera or still camera, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations, or combinations thereof.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

Figure 2:
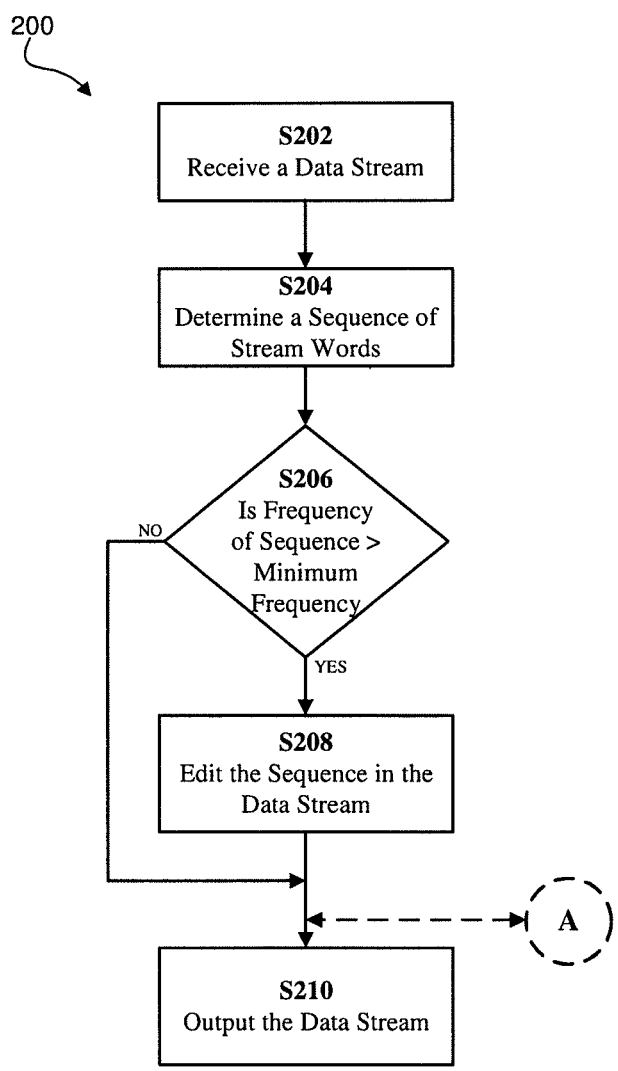
FIG. 2 is a flowchart of an exemplary embodiment of a method for editing a data stream, according to an aspect of the present disclosure.

A method for editing a data stream is generally shown at 200 in FIG. 2. The data stream may be an audio stream, a video stream, a text-based stream, or any combination thereof. Of course, those skilled in the art appreciate that additional data streams may also be edited.

According to the embodiment of the method 200 shown in FIG. 2, the data stream is received at S202. The data stream includes stream words. The stream words may be audible words or text-based words. Furthermore, the data stream may comprise any additional types of stream words, such as, for example, a combination of audible words and text-based words. In a non-limiting and exemplary embodiment of the present application, the data stream may be a conversation transcript between a customer service agent of a customer service center and a customer or potential customer. In this regard, the data stream may be received via any transmission medium, such as, but not limited to, a telecommunication network, a computer network, a recording medium, and air. The data stream may be previously recorded, or the data stream may be received in real-time at S202.

A sequence of the stream words of the received data stream is determined at S204. The sequence of stream words may be determined via automatic speech recognition, natural language processing, natural language generation, or any other method commonly known and understood in the art. In an embodiment of the present application, the sequence may include a predetermined number of the stream words. In additional embodiments of the present application, the sequence may comprise a predetermined percentage or portion of the stream words, a predetermined number of characters, or a predetermined number of sentences. Of course, the skilled in the art appreciate that the sequence may be determined by additional, or alternative, criteria in further embodiments of the present application.

The sequence of the stream words may include sequential words of the stream words. Alternatively, the sequence may be any other sequence of the stream words. For example, the sequence may include every other stream word, every third stream word, or any other series or succession of the stream words. Moreover, the sequence may include only a particular type of the stream words, such as, but not limited to, nouns, proper nouns, adjectives, or any other type of the stream words. Those skilled in the art appreciate that any sequence of the stream words may be determined according to various methods without departing from the scope of the present application.

At S206, it is determined whether the sequence of the stream words exists in a corpus at least at a predetermined minimum frequency. The corpus is a collection of data stored in a database. In this regard, in an embodiment of the present application, the corpus comprises a general collection of data. In an additional embodiment of the present application, the corpus comprises a plurality of distinct baseline data streams. For example, in the above-described embodiment in which the conversation transcript between the customer service agent and the customer or potential customer is edited for advertisements, the corpus may include a compilation of advertisements. Alternatively, the corpus may include a plurality of separate conversation transcripts between the same, or different, customer service agent and the same, or different, customer or potential customer. The corpus may include the data stream, itself, or, alternatively, the corpus may not include the data stream.

According to the embodiment of the present application as shown in FIG. 2, it is determined whether the sequence of stream words exists in the corpus at least at a predetermined minimum frequency at S206. In this regard, in the embodiment of the present application in which the corpus comprises a general collection of data, it may be determined whether the sequence exists in the corpus at least a predetermined number of times. According to the above-described non-limiting and exemplary embodiment in which the corpus comprises a compilation of advertisements, it may be determined whether the sequence is a phrase that is common to advertisements, such as, for example, "call now," thus suggesting that the sequence is an advertisement.

In the embodiment of the present application in which the corpus comprises a plurality of baseline data streams, it may be determined whether the sequence exists in a predetermined number of the baseline data streams. For example, in the above-described non-limiting and exemplary embodiment in which the corpus comprises a plurality of separate conversation transcripts, it may be determined whether the sequence is repeated in a predetermined number of the separate conversation transcripts, thus suggesting that the sequence is an advertisement.

In another embodiment of the present application in which the corpus comprises a plurality of baseline data streams, it may be determined whether the sequence exists in a predetermined percentage of the baseline data streams. Furthermore, in additional embodiments of the present application, the frequency of occurrence of the sequence within each of the baseline data streams may be considered when determining whether the sequence exists in the corpus at least at the predetermined minimum frequency. Of course, those skilled in the art appreciate that, in even further embodiments of the present application, additional methods of determining whether the sequence exists in the corpus at least at the predetermined minimum frequency may also be used.

In the embodiment of the present application as shown in FIG. 2, when it is determined that the sequence exists in the corpus at least at the predetermined minimum frequency, the sequence is edited in the data stream at S208. In this regard, the sequence may be deleted from the data stream, highlighted within the data stream, or flagged in the data stream. For example, in the embodiment of the present application as described above in which the data stream is the conversation transcript between the customer service agent and the customer or potential customer, if the data stream is edited to determine whether the sequence of the stream words is an advertisement, the sequence may be deleted from the data stream when it is determined that the sequence is an advertisement. Alternatively, if the data stream is edited to find a desired sequence of stream words, the sequence may be highlighted or flagged. Of course, those skilled in the art appreciate that the above-described embodiments are to be considered exemplary and are not to be considered limiting in any way. Furthermore, those skilled in the art appreciate that the sequence may be edited in the data stream via additional, or alternative methods, such as, but not limited, changing the color of the font of the sequence in the data stream.

As shown in FIG. 2, after the sequence has been edited in the data stream when the sequence exits in the data stream at least at the predetermined minimum frequency or when the sequence does not exist in the data stream at the predetermined minimum frequency, the data stream is output at S210. The data stream may be output via any transmission medium or to any recording medium commonly known and understood in the art.

FIG. 2 shows an embodiment of the present application in which only a single sequence of the stream words of the data stream is determined, analyzed, and edited. In additional embodiments of the present application, a plurality of sequences of the stream words of the data stream may be determined, analyzed, and edited. In this regard, the entire data stream may be separated into sequences, and each of the sequences may be analyzed in accordance with the method 200 shown in FIG. 2. Alternatively, in further embodiments of the present application, the entire data stream may be separated into sequences, and less than all of the sequences may be analyzed in accordance with the method 200 shown in FIG. 2. In even further embodiments, less than all of the data stream may be separated into sequences, and each of the sequences may be analyzed in accordance with the method 200 shown in FIG. 2.

Figure 3:
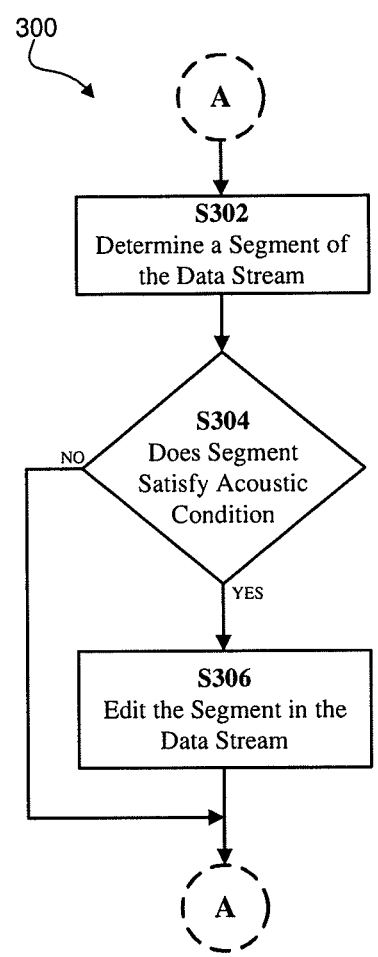
FIG. 3 is a partial view of a flowchart of an exemplary embodiment of the method as shown in FIG. 2, according to an aspect of the present disclosure.

An additional embodiment of a method for editing a data stream is generally shown, in part, at 300 in FIG. 3. As shown in FIGS. 2 and 3, the data stream is edited in accordance with the method 200 shown in FIG. 2, and is further edited in accordance with the method 300 shown in FIG. 3. In this regard, in addition to editing a sequence of the stream words of the data stream, the data stream is further edited based on a segment of the data stream at A.

The segment of the data stream is determined at S302. The segment has a duration. In an embodiment of the method 300, the segment may be determined such that the duration of the segment corresponds to a predetermined time period. In another embodiment of the method 300, the segment may be determined such that the duration corresponds to a predetermined number of the stream words. Of course, those skilled in the art understand that the data stream may be segmented according to additional, or alternative, methods as well.

After the segment is determined, the segment is analyzed based on an acoustic parameter to determine whether the segment satisfies a predetermined condition at S304. The acoustic parameter may be, but is not limited to, pitch, stress, emphasis, tone, accent, or frequency. The predetermined condition may be, but is not limited to, whether the acoustic parameter exceeds a predetermined threshold, maintains a predetermined average, or whether a variance of the acoustic parameter exceeds a predetermined threshold. For example, in the above-described embodiment of the present application in which the data stream is the conversation transcript between the customer service agent and the customer or potential customer, wherein the data stream is analyzed to edit advertisements, the acoustic parameter may be pitch, and the predetermined condition may be whether a variance of the pitch exceeds a certain threshold. Of course, in additional embodiments of the present application, the segment may be analyzed based on a different acoustic parameter and, or, acoustic condition or based on a plurality of acoustic parameters and, or, a plurality of acoustic conditions. U.S. patent application Ser. No. 12/634,981, the disclosure of which has been expressly incorporated herein by reference in its entirety, describes additional embodiments of the present application in which a segment of a data stream is analyzed and edited based on additional acoustic parameters and conditions.

In the method 300 shown in FIG. 3, when the segment satisfies the acoustic condition, the segment is edited in the data stream. In this regard, the segment may be deleted from the data stream, highlighted within the data stream, or flagged in the data stream. Of course, as discussed above, those skilled in the art appreciate that the segment may be edited in the data stream via additional, or alternative, methods.

After the segment has been edited in the data stream when the segment satisfies the acoustic condition or when the sequence does not satisfy the acoustic condition, the data stream is output as shown at S210 in FIG. 2.

FIG. 3 shows an embodiment of the present application in which only a single segment of the data stream is determined, analyzed, and edited. In additional embodiments of the present application, a plurality of segments of the data stream may be determined, analyzed, and edited. In this regard, the entire data stream may be separated into segments, and each of the segments may be analyzed in accordance with the method 300 shown in FIG. 3. Alternatively, in further embodiments of the present application, the entire data stream may be separated into segments, and less than all of the segments may be analyzed in accordance with the method 300 shown in FIG. 3. In even further embodiments, less than all of the data stream may be separated into segments, and each of the segments may be analyzed in accordance with the method 300 shown in FIG. 3.

Figure 4:
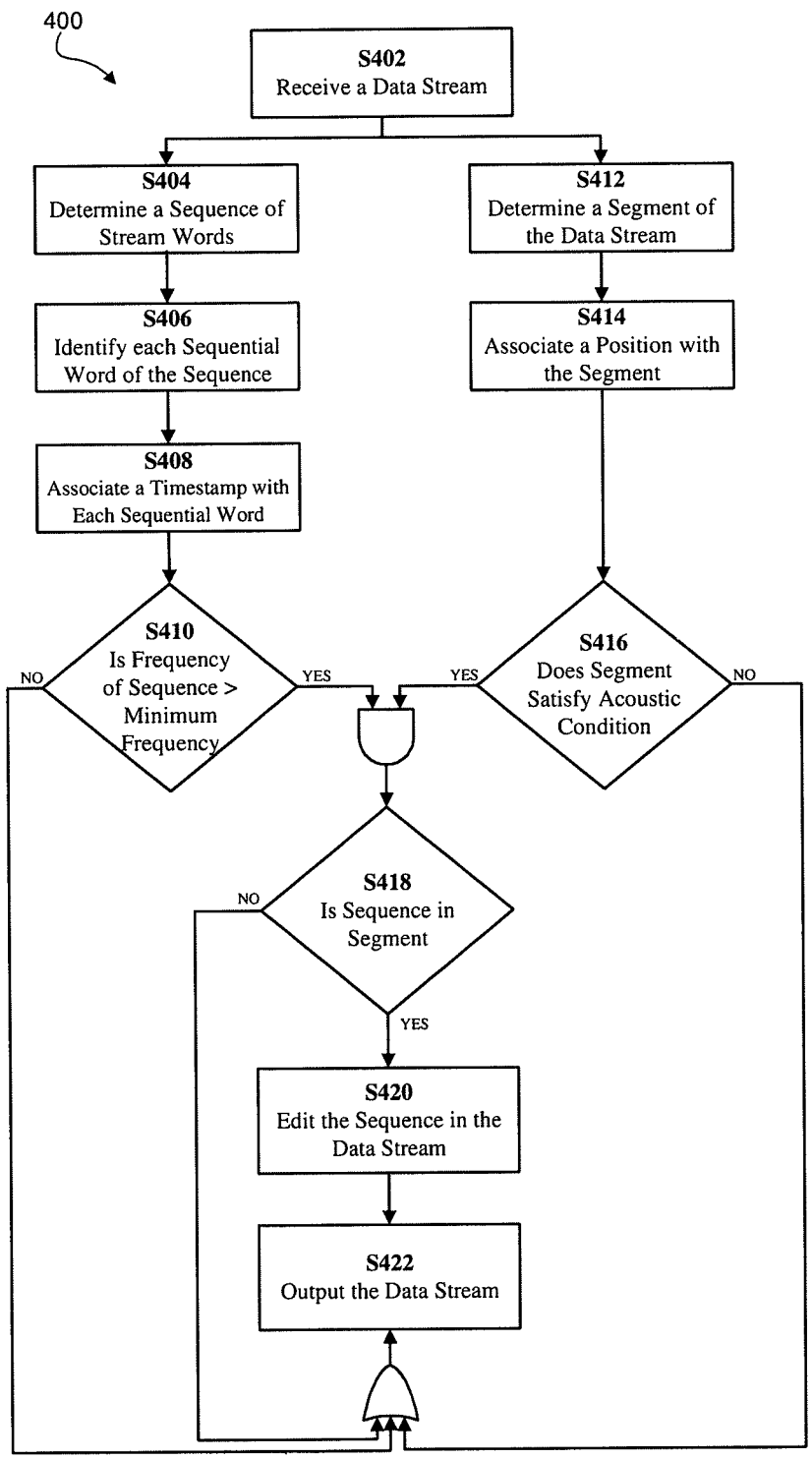
FIG. 4 is a flowchart of an exemplary embodiment of a method for editing a data stream, according to an aspect of the present disclosure.

FIG. 4 shows another embodiment of a method for editing a data stream based on a corpus. The method is generally shown at 400. According to the method 400, a data stream that includes stream words is received at S402. Thereafter, a sequence of the stream words is determined at S404. Each sequential word of the sequence is determined at S406. The words may be determined via automatic speech recognition, natural language processing, natural language generation, or any other method commonly known and understood in the art.

At S408, a timestamp is associated with each word of the sequence. In an embodiment of the method 400, the time stamp may be based upon the position of the corresponding word within the data stream as a whole. For example, if the data stream is a conversation transcript, the timestamp may identify a word as occurring at a certain point in the conversation from the beginning of the conversation. In an alternative embodiment of the method, the time stamp may be based upon the position of the corresponding word within the sequence, and a time stamp may be associated with the position of the sequence within the time stamp. For example, if the data stream is a conversation transcript, the time stamp of a word may identify the sequence within which the word exists as occurring at a certain point in the conversation from the beginning of the conversation, and may further identify the word as occurring at a certain point in the sequence from the beginning of the sequence. The time stamp may identify the beginning of a word, the end of a word, a range within which the word exists, or any other method of identifying the position of the word in the data stream, such as, for example, a number of the word within the data stream.

At S410, it is determined whether the sequence of stream words exists in the corpus at least at a predetermined minimum frequency.

In addition to determining a sequence of stream words of the data stream, the method 400 further determines a segment of the data stream at S412. While the sequence comprises a plurality of stream words, the segment is a portion of the data stream that has a predetermined duration. A position of the segment within the data stream is associated with the segment at S414. In an embodiment of the method 400, the position may be a time within the data stream at which the segment begins. An another embodiment of the method 400, the position may be a range of time that corresponds to the duration of the segment within the data stream. Of course, those skilled in the art appreciate that the position may comprise additional, or alternative, methods for identifying the segment within the data stream, such as, for example, a range of stream word identifiers that corresponds to the stream words that exist within the segment.

At S416, it is determined whether the segment satisfies an acoustic condition. In this regard, when it is determined that the segment satisfies the acoustic condition at S416 and when it is determined that the sequence of stream words exists in the corpus at least at the predetermined minimum frequency at S410, the method 400 determines whether the sequence exists in the segment at S418. That is, the method 400 determines whether any of the stream words of the sequence are included within the segment. In an embodiment of the method 400, it may be determined whether all of the stream words of the sequence exist in the segment at S418. In another embodiment of the method 400, it may be determined whether any of the stream words of the sequence exist in the segment.

In the embodiment of the present application as shown in FIG. 4, the method 400 may determine whether the sequence exists in the segment at S418 based on the timestamp of each of the stream words of the sequence, the position of the segment in the data stream, and the duration of the data stream. For example, if the data stream is a conversation transcript, when a stream word of the sequence has a timestamp that identifies the stream word as existing at the one minute, two second mark of the conversation transcript, the segment has a position that identifies the segment as beginning at the one minute mark, and the duration of the segment is ten seconds, it may be determined that at least a portion of the sequence exists in the segment based on the timestamp of the stream word, the position of the segment, and the duration of the segment. Of course, those skilled in the art appreciate that, in additional embodiments of the present application, alternative methods are employed for determining whether the sequence of stream words exists in the segment of the data stream. Furthermore, in additional embodiments of the method 400, it may be determined whether the sequence approximately exists in the segment at S418. That is, it may be determined whether the sequence is within a predetermined time period or distance of the segment.

According to the method 400 shown in FIG. 4, the sequence is edited in the data stream at S418 only when the sequence exists in the corpus at least at the predetermined minimum frequency, the segment satisfies the acoustic condition, and at least a portion of the sequence exists in the segment. When the sequence does not exist in the corpus at least at the predetermined minimum frequency, the segment does not satisfy the acoustic condition, or the sequence does not exist in the segment, then the sequence is not edited in the data stream. After it is determined whether to edit the sequence in the data stream, the data stream is output at S422.

In the method 400 shown in FIG. 4, a single sequence of stream words and a single segment of the data stream are determined, analyzed, correlated, and edited. In additional embodiments of the present application, it is to be understood that a plurality of sequences and segments may be determined, analyzed, correlated, and edited. In this regard, in an embodiment of the present application, at S418, it may be determined whether a segment that exists in the corpus at least at the predetermined minimum frequency exists in any segment that satisfies the acoustic condition. At S420, each sequence that exists in the corpus at least at the predetermined minimum frequency and that exists in any segment that satisfies the predetermined condition may be edited.

Figure 5:
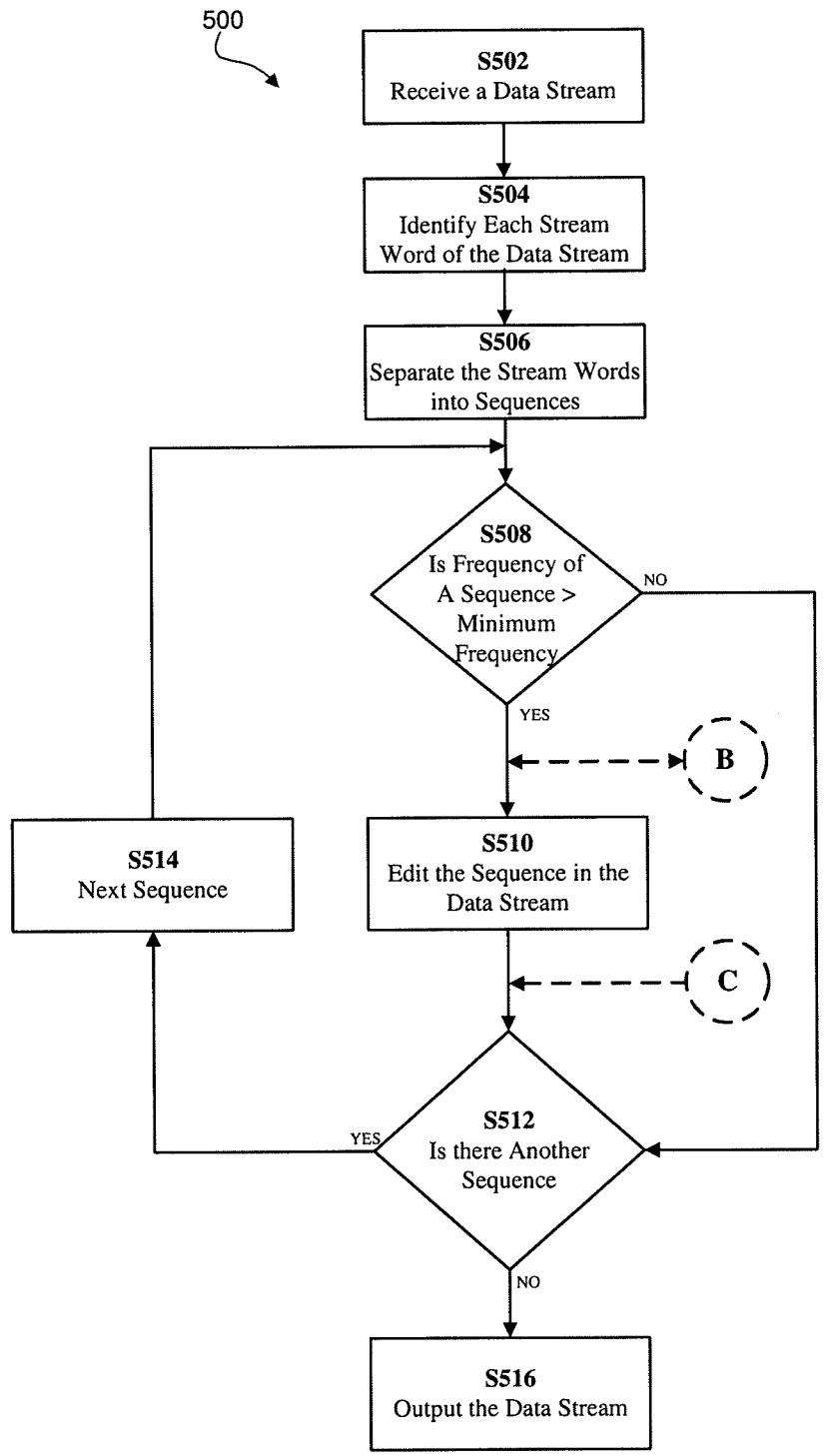
FIG. 5 is a flowchart of an exemplary embodiment of a method for editing a data stream, according to an aspect of the present disclosure.

FIG. 5 discloses another method for editing a data stream based on a corpus. The method is generally shown at 500. According to the method 500, a data stream that includes stream words is determined at S502. Each of the stream words of the data stream is identified at S504. Thereafter, the identified stream words are separated into a plurality of sequences of stream words at S506. For each sequence of stream words, it is determined whether the sequence exists in a corpus at least at a predetermined minimum frequency at S508. If the sequence exists in the corpus at least at the predetermined minimum frequency, the sequence is edited in the data stream at S510. After the sequence is edited in the data stream at S510, or if it is determined that the sequence does not exist in the corpus at the predetermined minimum frequency at S506, it is determined whether another sequence of stream words exists at S512. When another sequence exists, the next sequence is selected at S514 and it is determined whether that sequence exists in the corpus at least at the predetermined minimum frequency at S508. When it is determined that another sequence does not exist at S512, the data stream is output at S516.

Figure 6:
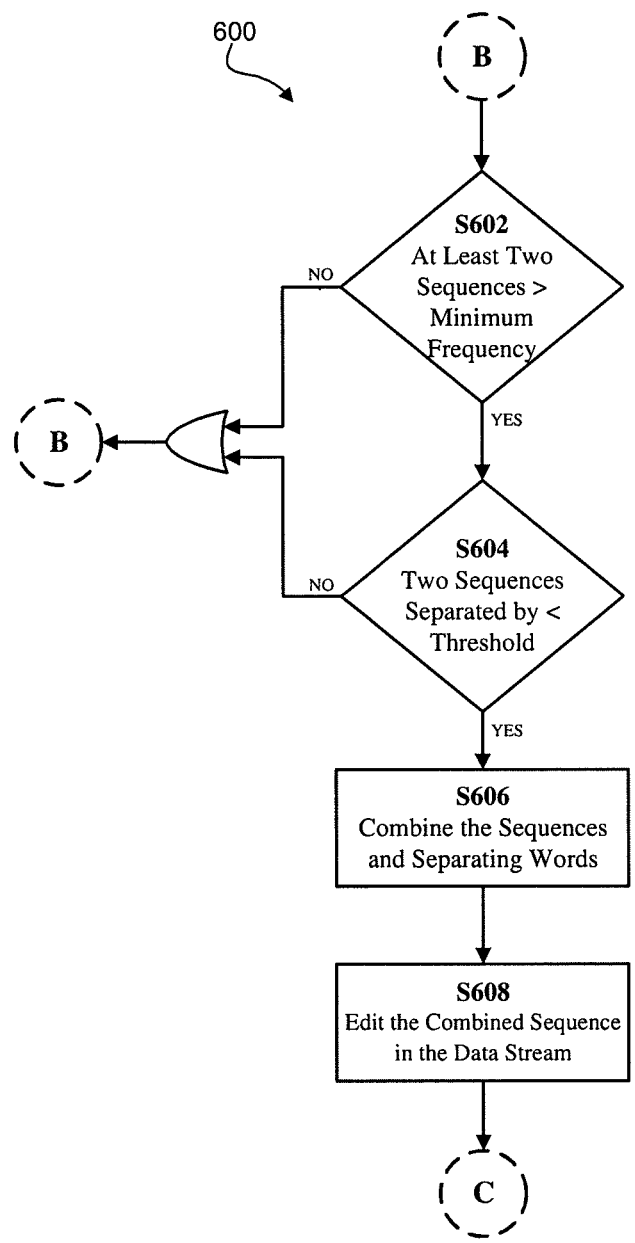
FIG. 6 is a partial view of a flowchart of an exemplary embodiment of the method as shown in FIG. 5, according to an aspect of the present disclosure.

FIG. 6 shows an additional embodiment of the method 500 for editing a data stream based on a corpus as shown in FIG. 500. The method of FIG. 6 is generally shown, in part, at 600. According to the method 600, it is generally determined whether each of a plurality of sequences of stream words of the data stream exist in the corpus at least at a predetermined minimum frequency.

After it is determined that one of the sequences of stream words exist in the corpus at the predetermined minimum frequency in the method 500 at B, the method 600 includes determining whether another sequence that exists in the corps at least at the predetermined minimum frequency exists at S602. If another sequence does not exist, then the sequence is edited in the data stream at S510 as shown in FIG. 5. If another sequence does exist, it is determined whether the sequence that exists in the corpus at the predetermined frequency is separated from another sequence that exists in the corpus at the predetermined frequency by less than a threshold separation factor at S604. The threshold separation factor may be a threshold number of words, a threshold length of time, or any other separation factor, such as, but not limited to a threshold number of sequences.

If the sequence that exists in the corpus at the predetermined frequency is not separated from another sequence that exists in the corpus at the predetermined frequency by less than the threshold separation factor at S604, then the sequence is edited in the data stream at S510 as shown in FIG. 5. On the other hand, if it is determined that the sequence is separated from another sequence that exists in the corpus at the predetermined frequency by less than the threshold separation factor at S604, then the two sequences and the stream words separating the two sequences are combined to define a combined sequence at S606. Thereafter, the combined sequence is edited at S608, and the method 600 returns to C as shown in the method 500 of FIG. 5.

The method 600 as shown in FIG. 6 provides the advantageous effect of identifying and editing a potentially undetected sequence or series of string words to be edited within the data stream. For example, in the above-described embodiment in which the data stream is the conversation transcript between the customer service agent and the customer or potential customer, wherein the data stream is analyzed to edit advertisements, a potentially undetected portion of an advertisement may be identified and edited. That is, if a first sequence of string words of the conversation transcript is determined to be an advertisement, and a second sequence of string words that is separated from the first string by a mere five seconds is also determined to be an advertisement, then it is likely that the portion of the data stream that separates the first and second sequences is also an advertisement. In this regard, if the portion separating the first and second sequences is not identified as an advertisement the method 600 as shown in FIG. 6 will combine and edit the first and second sequences and the portion of the data stream separating the first and second sequences.

In an embodiment of the method 600 shown in FIG. 6, it may be determined whether at least a portion of the combined sequence exists in a segment of the data stream that satisfies an acoustic condition as generally shown in the method 400 of FIG. 4. In this regard, the combined sequence may be edited only when the combined sequence exists in the segment that satisfies the predetermined condition to prevent the combined sequence from being edited erroneously. For example, in the exemplary embodiment of the present application in which advertisements are detected and edited in a conversation transcript, it may be determined whether sequences of words of the conversation transcript are advertisements. If two sequences are detected as being advertisements and the two sequences are separated by a mere five seconds, it may be assumed that the two sequences and the five seconds separating the sequences are an advertisement. In order to confirm such an assumption, based on the knowledge that advertisements generally include a greater pitch variance than normal conversation, it may be determined whether any portion of either of the two sequences or the five seconds separating the two sequences has a pitch variance that is greater than a predetermined threshold. If either of the two sequences or the five seconds separating the two sequences has a pitch variance that exceeds the predetermined threshold, the assumption that the two sequences and the five seconds separating the two sequences are an advertisement is reinforced.

According to a further embodiment of the present application, the methods 200, 300, 400, 500, and 600 may be optimized. That is, each data stream of a database of data streams may be analyzed and edited for sequences that exist in a corpus at least at a predetermined frequency. Based on the results of the analysis and editing, any of the number of words of the sequence, the duration of the segment, and the minimum frequency may be optimized. Furthermore, the threshold number of words or threshold length of time that separates two sequences may also be optimized.

Figure 7:
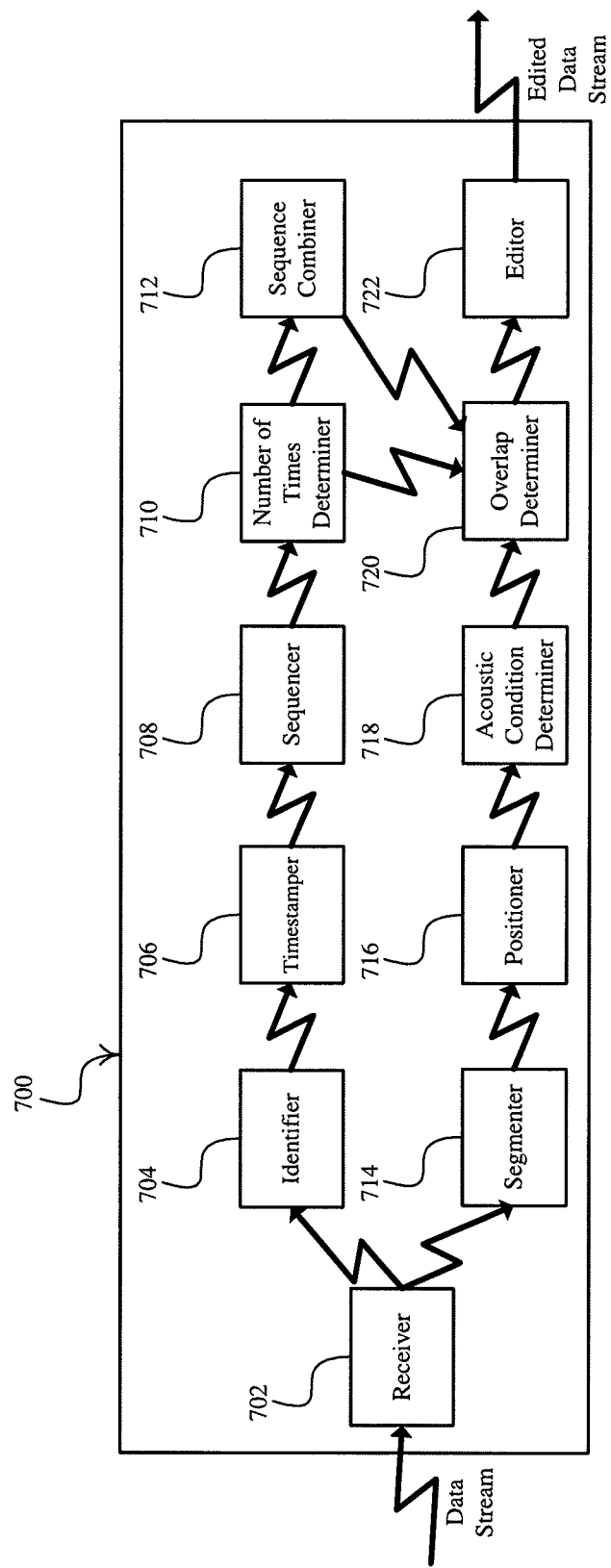
FIG. 7 is a schematic of an apparatus for editing a data stream, according to an aspect of the present disclosure.

In a further embodiment of the present disclosure, as generally indicated in FIG. 7, an apparatus 700 for editing a data stream based on a corpus is provided. The apparatus 700 includes a receiver 702 that receives a data stream including stream words. An identifier 704 identifies each of the stream words of the data stream. A time stamper 706 associates a time stamp with each of the identified stream words, and a sequencer 708 determines a sequence of the stream words that includes a predetermined number of sequential words of the stream words. A number of times determiner 710 determines whether the sequence exists in the corpus at least at a predetermined minimum frequency.

In an embodiment of the apparatus 700, the sequencer 708 may identify a plurality of sequences of stream words and the number of times determiner 710 may determine whether each of the sequences exists in the corpus at least at the predetermined minimum frequency. In such an embodiment, when the number of times determiner 710 determines that at least two of the sequences exist in the corpus at the predetermined minimum frequency, the apparatus 700 may include a sequence combiner 712 that determines whether two of the sequences that exist in the corpus at the predetermined minimum frequency are separated by less than either a threshold number of words or a threshold length of time. When the sequence combiner 712 determines that two of the sequences are separated by the threshold number of words or the threshold length of time, the sequence combiner 712 combines the two sequences and the string words separating the two sequences to define a combined sequence.

In the embodiment of the apparatus 700 as shown in FIG. 7, the apparatus 700 further includes a segmenter 714 that determines a segment of the data stream. The segment has a predetermined duration. A positioner 716 associates a position of the segment in the data stream with the determined segment. An acoustic condition determiner 718 determines whether the determined segment satisfies a predetermined acoustic condition.

In the embodiment of the apparatus 700 as shown in FIG. 7, when the number of times determiner 710 determines that the sequence exists in the corpus at the predetermined minimum frequency and the acoustic condition determiner 718 determines that the segment satisfies the predetermined acoustic condition, an overlap determiner 720 determines whether a portion of the sequence exists in the segment. When the sequence determiner 720 determines that the sequence exists in the segment, an editor 722 edits the sequence in segment. In the embodiment of the apparatus 700 that includes the sequence combiner 720 as shown in FIG. 7, when the sequence combiner 720 combines the two sequences and the string words separating the two sequences to define the combined sequence, the overlap determiner 720 determines whether a portion of the combined sequence exists in the segment. When the overlap determiner 720 determines that the combined sequence exists in the segment, the editor 722 edits the combined sequence in the data stream.

In an embodiment of the apparatus 700 as shown in FIG. 7, the editor 722 only edits the sequence in the data stream when the number of times determiner 710 determines that the sequence exists in the corpus at the predetermined minimum frequency, the acoustic condition determiner 718 determines that the segment satisfies the predetermined acoustic condition, and the overlap determiner 720 determines that the sequence exists in the segment. In another embodiment of the apparatus 700, the editor 722 edits the sequence whenever the number of times determiner 710 determines that the sequence exists in the corpus at the predetermined minimum frequency.

Furthermore, in an embodiment of the apparatus 700 as shown in FIG. 7, the editor 722 only edits the combined sequence in the data stream when the sequence combiner 720 defines the combined sequence, the acoustic condition determiner 718 determines that the segment satisfies the predetermined acoustic condition, and the overlap determiner 720 determines that the combined sequence exists in the segment. In another embodiment of the apparatus 700, the editor 722 edits the sequence whenever the sequence combiner 720 defines the combined sequence.

The present disclosure also provides a non-transitory tangible computer-readable medium encoded with an executable computer program for editing a data stream based on a corpus. The computer-readable medium includes a receiving code segment that receives a data stream including stream words. An automatic speech recognition code segment identifies each of the stream words of the data stream via automatic speech recognition. A timestamp code segment associates a time stamp with each of the stream words when the automatic speech recognition code segment identifies each of the stream words. A sequence determining code segment determines a sequence of the stream words that includes a predetermined number of sequential words of the stream words. A number of times determining code segment determines whether the sequence exists in the corpus at least at a predetermined minimum frequency, and an editing code segment edits the sequence in the data stream when the number of times determining code segment determines that the sequence exists in the corpus at the predetermined minimum frequency.

In an embodiment of the computer-readable medium, a segmenting code segment determines a segment of the data stream. The segment has a predetermined duration. A position code segment associates a position of the segment in the data stream with the determined segment. An acoustic condition determining code segment determines whether the determined segment satisfies a predetermined acoustic condition. In an embodiment of the computer-readable medium, when the acoustic condition determining code segment determines that the segment satisfies the predetermined condition, the editing code segment edits the segment in the data stream.

In another embodiment of the computer-readable medium, when the acoustic condition determining code segment determines that the segment satisfies the predetermined acoustic condition, an overlap determining code segment determines whether a portion of the sequence that exists in the corpus at the predetermined minimum frequency exists in the segment. The overlap determining code segment may determine whether the sequence exists in the segment based on the timestamp of the sequential words of the sequence, the predetermined duration of the segment, and the position of the segment in the data stream. In this regard, the editor only edits the sequence in the data stream when the number of times determining code segment determines that the sequence exists in the corpus at the predetermined minimum frequency, the acoustic condition determining code segment determines that the segment satisfies the predetermined acoustic condition, and the overlap determining code segment determines that a portion of the sequence exists in the segment.

In further embodiment of the computer-readable medium, the number of times determining code segment determines whether each of a plurality of sequences exists in the corpus at least at the predetermined minimum frequency. When the number of times determining code segment determines that at least two sequences exist in the corpus at the predetermined minimum frequency, a combining code segment determines whether the two sequences are separated by in the data stream by less than either a threshold number of words or a threshold length of time. When the two segments are separated by less than the threshold number of words or the threshold length of time, the combining code segment combines the two sequences and the words that separate the two sequences in the data stream to define a combined sequence. Thereafter, the editor edits the combined sequence in the data stream. In an alternative embodiment of the computer-readable medium, the editor only edits the combined sequence when the overlap determining code segment determines that a portion of the combined sequence exists in a segment of the data stream that satisfies the predetermined acoustic condition.

In further embodiments of the present disclosure, a transitory computer-readable medium encoded with an executable computer program for editing a data stream based on a corpus is provided.

According to the present disclosure, sequences of a data stream are able to be edited based on a corpus. In a non-limiting and exemplary embodiment of the present application, quality control analysts in customer service call centers often review conversation transcripts. The conversation transcripts often include advertisements randomly interspersed amongst dialogue. As such, it is oftentimes necessary for the quality control analysts to manually review the conversation transcripts to distinguish between the advertisements and the dialogue. In this regard, the present disclosure provides a method, apparatus, and computer-readable medium in which a sequence of words of a conversation transcript can be compared against a corpus of conversation transcripts to determine whether the sequence is repeated in the corpus at least at a predetermined minimum frequency. When the sequence is repeated in the corpus at the predetermined minimum frequency, it may be assumed that the sequence is an advertisement, and the sequence may be edited in the conversation transcript. Thus, the quality control analyst need not manually review the conversation transcript to distinguish between the advertisements and the dialogue contained therein.

(Pitch Dynamics Method)

In a non-limiting and exemplary embodiment of the present application in which advertisements are edited in customer service center call recordings, in an effort to increase a listener's attention, voices in audio advertisements generally tend to vary their pitch more rapidly than voices in other kinds of speech. Exemplary embodiments of editing call recordings which exploit such a characteristic are disclosed in related U.S. patent application Ser. No. 12/634,981, the disclosure of which has been expressly incorporated herein by reference in its entirety.

(Word N-Grams from ASR Output Method)

In another non-limiting and exemplary embodiment of the present application in which advertisements are edited in customer service center call recordings, a given advertisement is likely to appear in many call recordings. Therefore, call recordings are transcribed by automatic speech recognition (ASR) software and various word sequences of length n (henceforth, n-grams) that appear in a collection of conversation transcripts (i.e., a corpus) are considered. The n-grams that appear in the advertisements will be much more frequent than most other n-grams. This heuristic is far from foolproof because the sequences in a conversation transcript can start and/or stop in the middle of any advertisement. Also, noise in the call recordings can cause the ASR software to produce different outputs for different instances of the same advertisement. So, instead of trying to detect whole advertisements at a time, sequences of short overlapping n-grams may be used.

The non-limiting and exemplary embodiment of the present disclosure involves the following three parameters: the n-gram size (s); the minimum n-gram frequency ($f_{min}$); and the minimum word gap length ($w_{min}$). During an initial period, the frequencies of all n-grams, for suitable values of n, in a corpus of conversation transcripts are computed. Then, the three parameters are optimized using a test procedure and a suitable objective format.

The test procedure for each call recording includes: (i) run the ASR software over the call recording to produce a conversation transcript; (ii) find all sequences (A) of the conversation transcript such that $|A| \geq s$ and every s-gram a∈A has a frequency of at least $f_{min}$ in the frequency tables; (iii) for every pair of sequences found in the previous step, if they are separated by less than $w_{min}$ words in the conversation transcript, then combine them and their intervening words into a combined sequence; and (iv) output every substring found in the previous step as an advertisement.
(Combined Method)

In a further non-limiting and exemplary embodiment of the present application in which advertisements are edited in customer service center call recordings, there are some very frequent n-grams that do not come from advertisements, such as "your approximate wait time is . . . ," "thank you for calling . . . ," and "how are you today?" However, the intonation of these frequent n-grams that do not come from advertisements is unlikely to exhibit much pitch variance. Thus, to raise the precision of the n-gram method, it is combined with the pitch dynamics method. The ASR system outputs a timestamp for each word that it recognizes. These timestamps are used to match up the positions of advertisements hypothesized by the n-gram and pitch dynamics methods. The combined method output advertisements hypothesized by the n-gram method that overlapped at least partially with some advertisement hypothesized by the pitch dynamics method.

Experimental Embodiment

In an experimental embodiment of the present application in which advertisements were edited in customer service center call recordings, advertisement segments and non-advertisement segments were defined as time slices of an audio stream. Segments that contained no speech were discarded. Moreover, since a non-limiting and exemplary goal of the experimental embodiment was to avoid false hits during keyword searches of the conversation transcripts of the call recordings, certain parts of speech that were unlikely to be search terms were discarded. For example, all instances of two hundred eighty-three English function words, such as "the" and "who," and filler words, such as "um," were deleted from the conversation transcripts. Of course, those skilled in the art appreciate that, in additional embodiments, different combinations of words may be deleted.

Then, instead of comparing segments of audio, five advertisement detection methods were evaluated in terms of how well they edited out the content words that appeared in the advertisement segments of the content-word-only conversation transcripts. Specifically, two baseline methods were evaluated against the Pitch Dynamics Method, the Word n-Grams from ASR Output Method, and the Combined Method.

Under the first baseline method, a two-state ergodic Hidden Markov Model (HMM) that ranged over acoustic features was used to detect and edit the advertisements from the call recordings. One state of the HMM represented advertisements and the other state represented everything else. In principle, any part of the training data could be input to the procedure for estimating the HMM's emission probabilities. In the experimental embodiment, F0, F0', F0", and the standard 39 mel-frequency cepstral coefficients (MFCCs) from 100 ms frames were used. In a pilot experiment, the 100 ms frame length seemed to produce more stable results than the more common 10 ms frame length.

Under the second baseline method, a three-state HMM was used. The three-state HMM was just like the two-state HMM except with an addition state to represent silence.

For each method, each word in each conversation transcript was annotated with the call recording that it came from and with its position in the conversation transcript of that call recording. Each advertisement in each call recording was mapped to a set of these annotated words. The advertisement segments hypothesized by each of the five advertisement detection methods were mapped to the same representation. The hypothesized and correct sets of annotated words were then compared using the standard measures of precision, recall, and their harmonic mean, a.k.a. $F_1$.

In the experimental embodiment, 5-fold cross-validation was used to evaluate each of the five advertisement detection methods. Each "fold" used a different 80/20 split into training and test sets, so that each of 100 annotated call recordings appeared in a test set exactly once. At test time, the annotated word sets for all 20 test call recordings were pooled into one set before computing the evaluation measures, so that the result would be a micro-average.

The boundaries between advertisements and non-advertisements in the training data allowed the parameters of our two-state HMM to be computed directly, without re-estimation. To estimate the silence parameters for the three-state HMM, a standard voice activity detection algorithm was applied to the training data, and then standard maximum likelihood estimation was applied. At test time, both HMMs were decoded using the Viterbi algorithm. A grid search over plausible parameter values was used to optimize the parameters of the Pitch Dynamics Method, the Word n-Grams from ASR Output Method, and the Combined Method. The six parameters of the combined method were optimized together, independently of their optimization for each of the component methods.

The results of the experimental embodiment are shown in FIG. 8. FIG. 8 shows the mean precision, recall, and $F_1$ measures for all five methods. The difference between each pair of different means is statistically significant at p=0.01 using the t-test for paired samples. In the experimental embodiment, the Pitch Dynamics Method turned out to be a good way to detect advertisements, even on its own. The Word n-Grams from ASR Output Method is even more reliable. Combining these two sources in the Combined Method yields a method whose error rate is eighty-one percent lower than that of the best HMM baseline method.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, an exemplary embodiment of the present application has been described in which audio advertisements are edited from an call recordings. However, those skilled in the art appreciate that in alternative embodiments of the present application video advertisements may be edited from a video recordings. Additionally, those skilled in the art further appreciate that the present application is not limited to editing advertisements in a data stream but may be applied to edit any extraneous or unwanted data stream sequence in a data stream. Furthermore, the present application my be applied to edit desirable or wanted data stream sequences in a data stream.

While a computer-readable medium herein may be shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for power over ethernet represent an example of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for editing a data stream based on a corpus, the data stream including stream words, the method comprising:
    determining, by a processor, whether a segment of the data stream satisfies a predetermined acoustic condition, the segment having a predetermined duration;
    determining, by the processor, whether a sequence of the stream words exists in the corpus at a predetermined minimum frequency, the sequence including a predetermined number of sequential words of the stream words;
    determining, by the processor, whether a portion of the sequence exists in the segment; and
    editing the sequence in the data stream when the segment satisfies the predetermined condition, the sequence exists in the corpus at the predetermined minimum frequency, and the portion of the sequence exists in the segment.

2. The method as set forth in claim 1, further comprising:
    editing the segment in the data stream when the segment satisfies the predetermined condition.

3. The method as set forth in claim 1, wherein
    the sequence is edited in the data stream only when the portion of the sequence exists in the segment, the sequence exists in the corpus at the predetermined minimum frequency, and the segment satisfies the predetermined condition.

4. The method as set forth in claim 1, further comprising:
identifying, within the data stream, each of the sequential words of the sequence via automatic speech recognition;
associating a timestamp with each of the sequential words;
associating a position of the segment in the data stream with the segment; and
determining whether the portion of the sequence exists in the segment based on the timestamp of each of the sequential words of the sequence, the predetermined duration of the segment, and the position of the segment in the data stream.

5. The method as set forth in claim 1, further comprising:
identifying each of the stream words of the data stream via automatic speech recognition; and
separating the stream words of the data stream into a plurality of sequences, each of the plurality of sequences including the predetermined number of sequential words of the stream words, the sequence being one of the plurality of sequences.

6. The method as set forth in claim 5, further comprising:
for each sequence of the plurality of sequences:
determining whether the sequence exists in the corpus at the predetermined minimum frequency;
determining whether a portion of the sequence exists in the segment; and
editing the sequence in the data stream when the segment satisfies the predetermined condition, the sequence exists in the corpus at the predetermined minimum frequency, and the portion of the sequence exists in the segment.

7. The method as set forth in claim 6, wherein, when two of the plurality of sequences exist in the corpus at the predetermined minimum frequency, the method further comprises:
determining whether the two of the plurality of sequences are separated in the data stream by less than one of a threshold number of words and a threshold length of time;
combining the two of the plurality of sequences and separating words that separate the two of the plurality of sequences to define a combined sequence when the two of the plurality of sequences are separated by less than the one of the threshold number of words and the threshold length of time;
determining whether a portion of the combined sequence exists in the segment; and
editing the combined sequence in the data stream when the segment satisfies the predetermined condition and the combined sequence exists in the segment.

8. The method as set forth in claim 7, wherein
the data stream is a conversation transcript, and
each of the plurality of sequences that exists in the corpus at the predetermined minimum frequency and the combined sequence are for identifying advertisements in the conversation transcript.

9. The method as set forth in claim 8, further comprising:
optimizing the predetermined number of sequential words, the predetermined minimum frequency, and the one of the threshold number of words and the threshold length of time based on a database of conversation transcripts that include the advertisements.

10. A non-transitory computer-readable recording medium having an executable computer program for editing a data stream based on a corpus, the data stream including stream words, that, when executed by a processor, causes the processor to perform operations comprising:
determining whether a segment of the data stream satisfies a predetermined acoustic condition, the segment having a predetermined duration;
determining whether a sequence of the stream words exists in the corpus at a predetermined minimum frequency, the sequence including a predetermined number of sequential words of the stream words;
determining whether a portion of the sequence exists in the segment; and
editing the sequence in the data stream when the segment satisfies the predetermined condition, the sequence exists in the corpus at the predetermined minimum frequency, and the portion of the sequence exists in the segment.

11. The non-transitory computer-readable recording medium as set forth in claim 10, the operations further comprising:
editing the segment in the data stream when the segment satisfies the predetermined condition.

12. The non-transitory computer-readable recording medium as set forth in claim 10, wherein
wherein the sequence is edited in the data stream only when the portion of the sequence exists in the segment, the sequence exists in the corpus at the predetermined minimum frequency, and the segment satisfies the predetermined acoustic condition.

13. The non-transitory computer-readable recording medium as set forth in claim 10, the operations further comprising:
identifying, within the data stream, each of the sequential words of the sequence via automatic speech recognition;
associating a timestamp with each of the sequential words;
associating a position of the segment in the data stream with the segment and
determining whether the portion of the sequence exists in the segment based on the timestamp of each of the sequential words of the sequence, the predetermined duration of the segment, and the position of the segment in the data stream.

14. An apparatus for editing a data stream based on a corpus, the data stream including stream words, the apparatus comprising:
a processor; and
a memory storing instructions that, when executed by the processor, cause the processor to perform operations comprising:
determining whether a segment of the data stream satisfies a predetermined acoustic condition, the segment having a predetermined duration;
determining whether a sequence of the stream words exists in the corpus at a predetermined minimum frequency, the sequence including a predetermined number of sequential words of the stream words;
determining whether a portion of the sequence exists in the segment; and
editing the sequence in the data stream when the segment satisfies the predetermined condition, the sequence exists in the corpus at the predetermined minimum frequency, and the portion of the sequence exists in the segment.

15. The apparatus as set forth in claim 14, the operations further comprising:
editing the segment in the data stream when the segment satisfies the predetermined acoustic condition.

16. The apparatus as set forth in claim 14, wherein the sequence is edited in the data stream only when the portion of the sequence exists in the segment, the sequence exists in the corpus at the predetermined minimum frequency, and the segment satisfies the predetermined acoustic condition.

17. The apparatus as set forth in claim 14, the operations further comprising:
identifying, within the data stream, each of the sequential words of the sequence via automatic speech recognition;
associating a timestamp with each of the sequential words;
associating a position of the segment in the data stream with the segment; and
determining whether the portion of the sequence exists in the segment based on the timestamp of each of the sequential words of the sequence, the predetermined duration of the segment, and the position of the segment in the data stream.

18. The apparatus as set forth in claim 14, the operations further comprising:
identifying each of the stream words of the data stream via automatic speech recognition; and
separating the stream words of the data stream into a plurality of sequences, each of the plurality of sequences including the predetermined number of sequential words of the stream words, the sequence being one of the plurality of sequences.

19. The apparatus as set forth in claim 18, the operations further comprising:
for each sequence of the plurality of sequences:
determining whether the sequence exists in the corpus at the predetermined minimum frequency;
determining whether a portion of the sequence exists in the segment; and
editing the sequence in the data stream when the segment satisfies the predetermined condition, the sequence exists in the corpus at the predetermined minimum frequency, and the portion of the sequence exists in the segment.

20. The apparatus as set forth in claim 19, the operations further comprising:
determining whether the two of the plurality of sequences are separated in the data stream by less than one of a threshold number of words and a threshold length of time;
combining the two of the plurality of sequences and separating words that separate the two of the plurality of sequences to define a combined sequence when the two of the plurality of sequences are separated by less than the one of the threshold number of words and the threshold length of time;
determining whether a portion of the combined sequence exists in the segment; and
editing the combined sequence in the data stream when the segment satisfies the predetermined condition and the combined sequence exists in the segment.

\* \* \* \* \*

UNITED STATES PATENT AND TRADEMARK OFFICE
CERTIFICATE OF CORRECTION

| | | |
|---|---|---|
| PATENT NO. | : 8,606,585 B2 | Page 1 of 1 |
| APPLICATION NO. | : 12/884436 | |
| DATED | : December 10, 2013 | |
| INVENTOR(S) | : Ilya Dan Melamed et al. | |

It is certified that error appears in the above-identified patent and that said Letters Patent is hereby corrected as shown below:

In the Claims

Column 22, lines 22 and 23 (claim 12, lines 2 and 3) please change "wherein wherein" to --wherein--

Signed and Sealed this
Second Day of September, 2014

Michelle K. Lee
*Deputy Director of the United States Patent and Trademark Office*